United States Patent Office 3,409,829
Patented Nov. 5, 1968

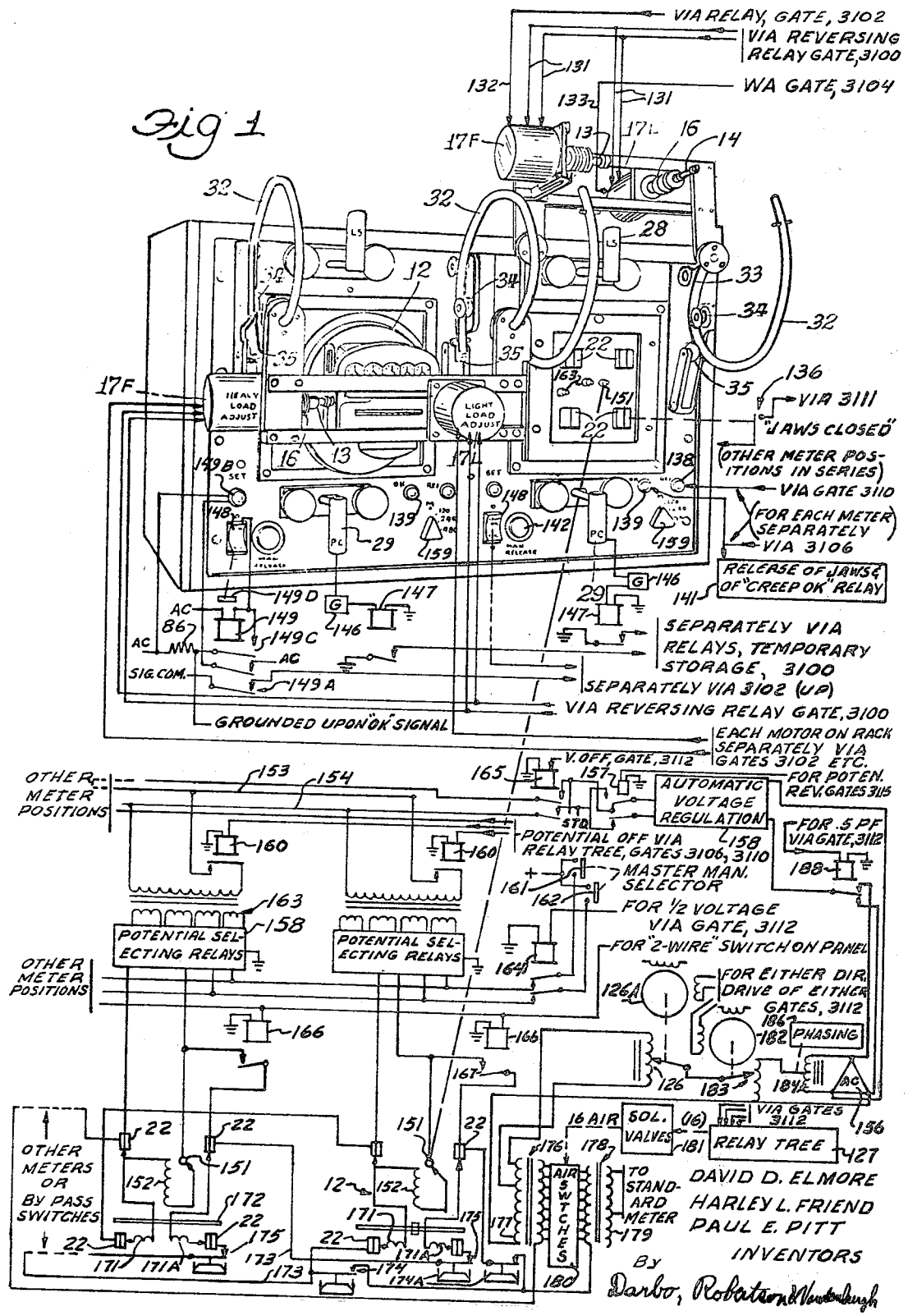

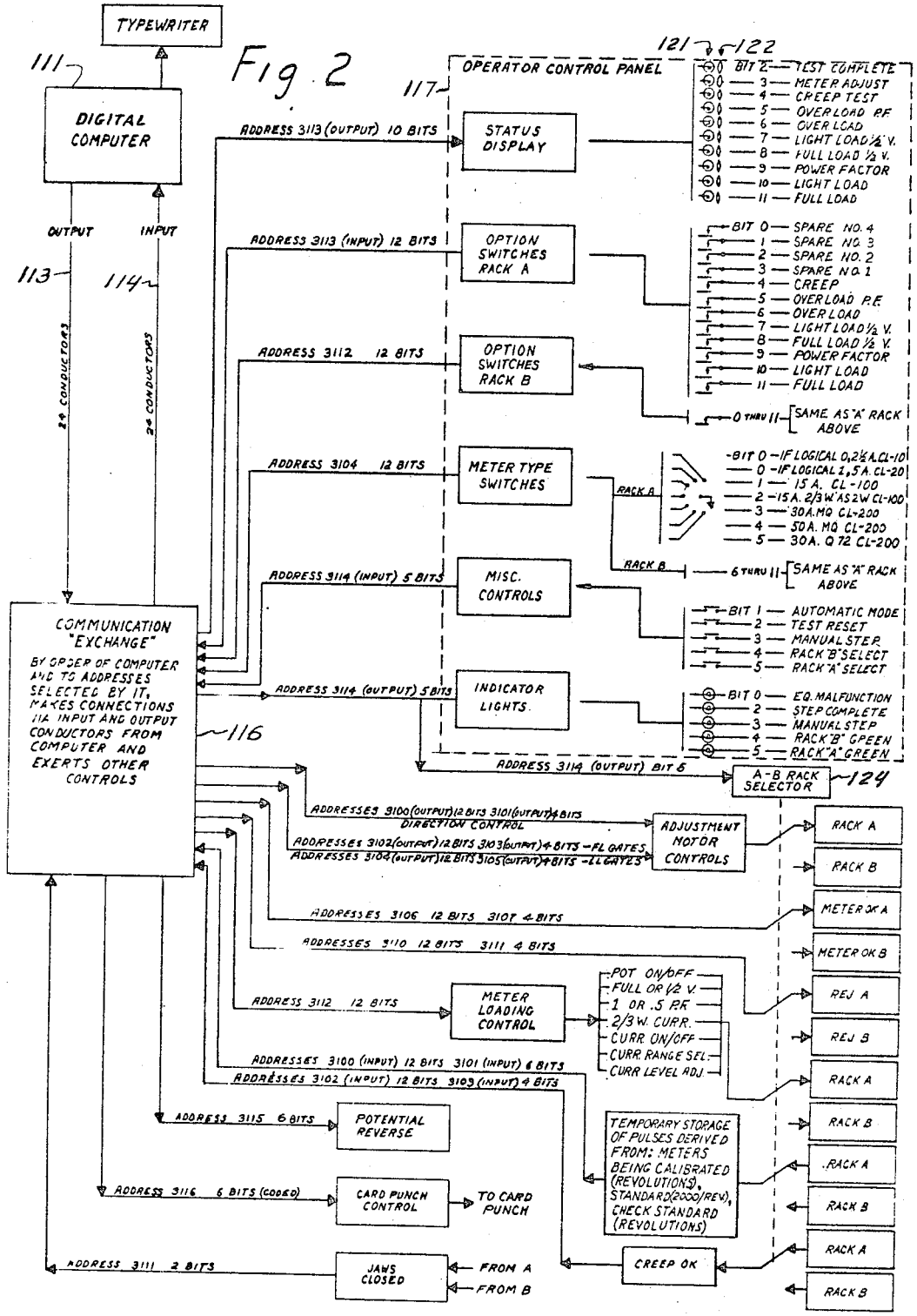

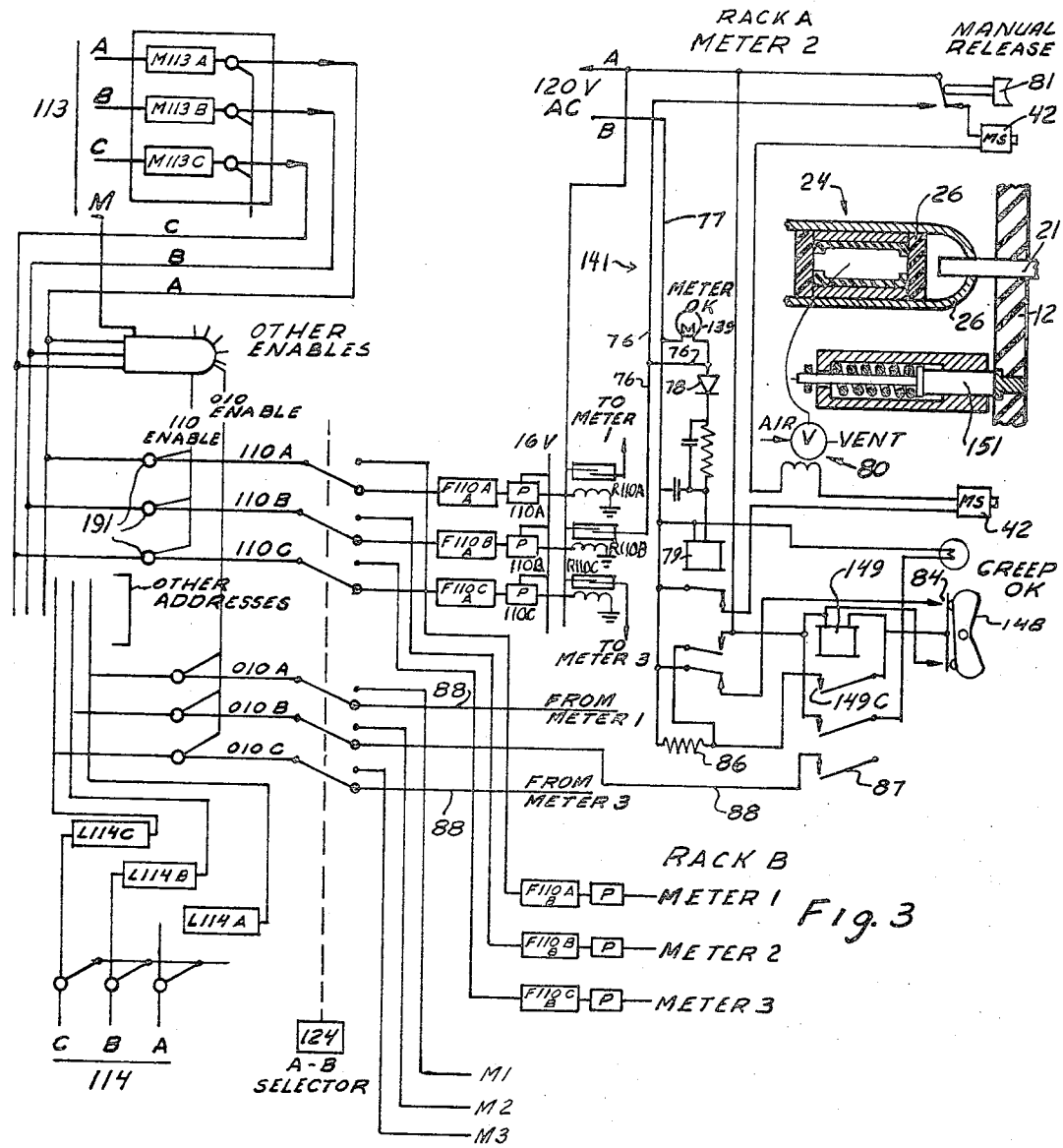

3,409,829
COMPUTER-CONTROLLED METER CALIBRATION METHOD AND APPARATUS
David D. Elmore and Harley L. Friend, Lafayette, and Paul E. Pitt, West Lafayette, Ind., assignors to Duncan Electric Company, Inc., a corporation of Indiana
Filed July 5, 1966, Ser. No. 563,642
14 Claims. (Cl. 324—74)

The invention, of which this disclosure is offered for public dissemination in the event a patent can be granted, relates to the automatic calibration of watt-hour meters. The present invention contemplates a system of watt-hour meter calibration in which the entire operation can be computer-controlled.

Great accuracy is now demanded in watt-hour meters, the ordinary electricity meters with which home owners are acquainted. The users of electrical power do not want to be overcharged. The sellers of electrical power are perhaps even more anxious not to have their good will damaged by overcharging. But, of course, they are also anxious not to give away power due to undercharging. Accuracy is demanded by regulatory bodies so that all users will be charged equitably.

To achieve even reasonable accuracy, each meter must be individually calibrated. Conventionally, calibration has included making comparison runs of the meter being calibrated with a standard meter, both being subjected to the same energizing and loading circuitry, comparing the results, and making an adjustment in the meter being calibrated to correct its error. Conventionally, there are several such comparison runs with different loadings, and repetitions for possible further corrections. Perhaps the most accurate calibrating has been done in the manner taught by Burkhart Patent No. 2,957,132 in which the standard meter produced impulses at a fairly high frequency typified by scanning the passage of circumferentially arranged demarcations, these impulses being counted by an electronic digital counter during an exact revolution of a meter being calibrated. With a backward count starting at the proper number, e.g. 1000, the departure of the final count from "0" would indicate the degree and direction of error. It was also conventional to make a comparison run involving a number of meters being calibrated concurrently. Each would be provided with its own electronic digital counter which would be started and stopped under control of a revolution detector scanning the disk of the meter being calibrated. After each comparison run, each meter's percentage of error would be indicated by its associated digital counter, and the operating technician would use that as a guide to judge the amount of corrective adjustment to make on the calibrating screw of the meter corresponding to the comparison run in question.

According to the present invention, apparatus is provided which makes possible the use of an electronic digital computer to control the whole calibrating procedure, including making the corrective adjustments on each of the meters. Furthermore, the corrective adjustments can be made more accurately than heretofore, not only because of the computer's ability to estimate the amount of corrective adjustment for a given error more accurately than any human, but also because the computer can accurately calculate the effect of interrelation between different adjustments and accurately measure the adjustment as made. The apparatus of this invention, in its preferred form, also enables the computer to perform such further tasks as making sure that the meters on a rack are all connected, indicating which meters have been adjusted to an acceptable accuracy, which are rejected and which should be left on the rack for another try, and to keep track of the latter so that if they do not reach acceptable accuracy on the second try they will be rejected. It can also produce a typed-out report on each meter. An important feature of the invention is that with a properly designed unit (which may be called an "interface unit," a "communication center" or an "exchange") to translate the computer's orders, make the necessary connections and yield to the computer the proper input signals, a standard or general purpose digital computer can be used. Of course, it will have a highly specialized program incorporated therein by a programming tape, or other input.

Additional objects and advantages of the invention will be apparent from the following description and the drawings.

DESIGNATION OF FIGURES

FIGURE 1 is a largely diagrammatic representation of two of the meter positions.

FIGURE 2 is a diagrammatic representation of the system, especially with reference to the "exchange" and the controls.

FIGURE 3 includes a wiring diagram of certain parts of a meter position and a schematic illustration of the exchange facilities for connection thereto.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

GENERAL DESCRIPTION

The apparatus of the preferred form of the present invention is shown in simplified diagrammatic form in FIG. 2. The reference therein to racks A and B denotes the fact that two test racks for meters to be calibrated are used alternately. While the computer is carrying out the entire calibration operation of 16 meters, the operator is removing from the other test rack meters which have been calibrated, and reloading it with 16 meters to be calibrated. The illustration follows actual apparatus in use which has 16 meter positions on each rack. Of course, more could be provided. Also, some can be left empty. Each test rack position is preferably of the form shown in application Serial Number 505,072, filed October 24, 1965, by Harley L. Friend, from which FIG. 1 is here reproduced. Perhaps the aspects of that disclosure most important to the present invention are the provision of photoelectric means 29 to provide a pulse at the beginning and end of one exact revolution of each meter disk, and a pair of calibration motors 17F and 17L at each test position, one for each of the meter's calibrating adjustment screws. Thus, as the operator thrusts a meter 12 into position (whereupon it is automatically locked in place and connected to the circuitry) he will also apply to each of the calibration adjustment screws its flexible screwdriver connection 13 or 14. That application is especially concerned with structural features, such as the spiral swing-support rods 32 by which correction motors 17L and 17F are carried, and their spring-urge biasing rollers 35.

The present application relates more to the whole system, partially represented in FIG. 1 by the circuitry shown, and more fully brought out in FIG. 2.

The apparatus represented in FIG. 2 includes a general purpose computer 111 connected by input cable 114 and output cable 113, with 24 lines or conductors each, to an "exchange" 116 which functions as a communication and connection center between the computer 111 and various "addresses" or operating units which it must control.

Exchange 116 receives from computer 111 computer "words" which comprise addresses, together with separate signals telling what to do with these addresses. In computer terminology, a "word" is a group of "bits" or characters which the particular computer handles as a group. In the case of the computer here contemplated the words have twelve bits each. Inasmuch as this computer operates on a binary system, each bit has only two "logical" states, either 1 or 0. The 1 state can be represented by a magnetized condition in the case of a memory unit, and in the case of signals by small voltage. "0" can be a reverse voltage or magnetism, but is more often substantially no voltage. Also "flip-flop" transistor circuits are often used to "hold" a state. Twelve binary characters or "bits" can readily be translated to provide an address.

Within exchange 116 each address is represented by its own "enable" line which is chosen by an electronic selector network when and only when the particular array of 1's and 0's in a received "word" constitutes its address. Those accustomed to working with computers can easily translate the same twelve-bit computer word to a 4-digit number which represents the same address in more convenient form. These 4-digit numbers are shown in FIG. 2. It may be observed that none of the digits in these 4-digit numbers are higher than 7. This is because these numbers are, for convenience of translation from the binary system, confined to the octal numbering system in which 8 is the base instead of the decimal numbering system in which 10 is the base. Thus the digit characters run from 0 to 7, instead of from 0 to 9.

In FIG. 2 all of the various units or devices (of the preferred apparatus) with which the exchange 116 can make connection by which the computer can exert control or receive a signal are shown diagrammatically. For convenience, each is given the four octal digit address number which happens to be assigned to it in fact in the actual calibration apparatus which has been successfully operated. Any other numbers could have been given, but in the actual equipment each number or address is permanently "built-in" in the sense that the recognition or address network associated with each device for recognizing its word-address would have to be altered in order to recognize any other number or computer word. The computer 111 is, of course, programmed to use this word whenever it is to use the address which it represents.

Within each 24 conductor cables 113 and 114, each of twelve of the conductors is identified with the successive bit positions of a word, and these are the information lines. Others are used for control signals to the exchange, and the like.

The twelve bit lines of the output cable are used for designating all addresses in the exchange. The same bit lines, when connected to any address relating to individual meters, are used one for each meter. The remainder of the sixteen meters on a rack not reached at one address are reached by a separate call, at a second address. In FIG. 1 and the description of it, the second addresses are omitted for simplification.

The purposes of the various devices connectable with the computer may be sufficiently apparent from considering the steps of a typical calibration operation.

MAJOR STEPS OF TYPICAL CALIBRATION OPERATION (1) *Read manual selection switches and prepare.*—This step, like all others, will include various substeps. The actual program previously recorded in the computer 111 may include many instruction words for successive steps in performing a single one of the steps here listed. Many of the minor steps are not described here.

On the control panel or console the operator will set or press various switches or buttons according to the types of meters being tested and the types of calibration operations desired. The computer must be enabled to read these settings so that it will follow the particular instructions in its programming which are proper for these manual settings. Also, when one test rack is ready with its load of meters to be tested or calibrated, the operator will press a button operating a "ready" switch for that test rack. Only when the computer reads that such a switch has been thrown will it start any further steps, except a preliminary step to "clear" the "exchange," removing from it conditions left from the preceding operation.

When the computer 111 has transmitted the address word 3114 together with a "connect" signal, it may "read" the operator's control panel 117 to see which rack is designated by the operator to be ready. Let us assume it is rack A. After determining that rack A is selected, the computer sends signals to address 3114 over bit 5 to clear any previous rack light and light the light showing that rack A is chosen. Conveniently, this is a light within the button pressed. Bit 5 also actuates a circuit to control relay 124 to operate all of the necessary control switching to effectuate the choice of rack A. In most instances, one line in this switching between racks represents numerous bits to be switched. Now the computer can call for address 3113 and read which optional tests were decided upon by the operator for the meters on rack A, each option being indicated over one of the 12 word-bit lines, depending on whether its switch at the console 117 is open or closed. Thus, if the manufacturer wants to include a test for creep (rotation of the disk with only the meter's voltage coil energized) he throws the "Creep" lever and the computer will record this election and, at the right time, use the "creep" part of its program.

Likewise, using address 3104, the computer reads what type of meters is to be tested, and records this for use in selecting the appropriate parts of its program accordingly.

From address 3114 the computer input learns of the other manual settings of the miscellaneous controls indicated in FIG. 2. It will not start its next major step until it receives a signal either that "automatic mode" has been selected, or that the manual step button has been pressed. Let us assume it is "automatic mode," so that the computer just keeps going.

(2) *Display FULL LOAD status.*—It is desirable for the operator (and interested observers) to be able to know what part of the calibrating operation is taking place. One of the output bits connected to address 3113 will, when signalled by computer 111, cause illumination of a light which tells the operator that the full load comparison run is being made. The preferred form of these status indications is to project on a small screen or ground glass on the console suitable descriptive words, in this case "Full Load." The other signals available for projection in the present apparatus are shown at the upper right in FIG. 2. Projection is indicated there by lamps 121 and lenses 122.

(3) *Do "Full Load as Found" test.*—In this major step the computer will control all of the necessary aspects of making a comparison run while the meters are under a relatively heavy load designated "Full Load."

For this task, the computer will tell the exchange to make connections to addresses 3112, 3100, 3101, 3102, and 3103. It may be observed from FIG. 1 that some of these addresses make connections to more than one piece of apparatus. In this instance, signals over different bits will cause the switching connections as to rack A for selection of full voltage for energizing the potential coils, and the full load current value for energizing the current coils, of the type of meter the computer has learned is under test. The computer can also direct turning on or off of both the potential circuit and the load circuit, as needed. The potential voltage is automatically regulated at the chosen value by equipment associated with the meter rack, preferably that of an application of Harley L. Friend and Robert L. Cattell filed nearly concurrently herewith. Regulation of the value of the load current, however, is adjusted under control of the computer. The computer does this by sending signals over bit lines connected to address 3112 to regulate motor driven variable autotransformers 126 and 183 associated with rack A. It first makes a calculated adjustment of autotransformer 183. Then it determines the need for fine adjustment by measuring the frequency of pulses derived from the standard meter in rack A, these being transmitted to the computer over one of the computer input bit lines connected to address 3101. More specifically, the computer calculates the number of advancing impulses it should allow to the stepping motor 126A which adjusts the transformer 126, then allows that number of impulses, then compares the rate at which impulses from the standard meter are received with the proper rate, then it may recalculate the amount of adjustment necessary and the direction of adjustment, and sends signals to accomplish this adjustment. For the most part, the computer's program for this adjusting task can be much the same, after initial predetermined adjustment of autotransformer 183, for all meters for full load and for light load, because it is desirable that the standard meter always run on 5 amperes. The ratio of this to the current for the meters under test is controlled by coded signals sent over four bit lines devoted to "current range selection" at address 3112. They will operate a relay tree 127 to select the proper tap of a precision current transformer, considering both what meters are on the rack and whether the test is to be at light load or full load.

With the autotransformer 126 adjusted and relay tree 127 set, the computer will now "watch" for pulses of two types: (A) those derived over one bit from the standard meter at a frequency of about 555 per second (or half of this at .5 PF), and (B) those derived from the various meter disk revolution or position detectors of the meters being compared with it. These pulses will be received over addresses 3100 and 3101, using for each meter the bit line assigned to it in the exchange, i.e., for which it is "design-set." The computer may be assumed to have a counter for each of the meter positions. Actually each "counter" comprises two 12-bit memory cells and suitable program manipulation. Each such counter is used to start and stop counting the standard meter pulses when "told" to do so. The computer starts the count for each meter being calibrated when the first revolution signal over that meter's line is received, that signal showing an anticreep hole has just reached the light beam. That counting will be stopped when the same type of signal over the same line indicates that the disk of that meter has exactly completed one revolution. If there are two anticreep holes, the computer is programmed to wait for the second after a start. When all of the meters being calibrated have completed one revolution, the computer will store in it a deviation number (derived from the count) showing the accuracy for each meter at full load. The program terminates this step after a reasonable time, in case any meter fails to operate normally.

(4) *Display LIGHT LOAD status.*—By the appropriate bit connection at address 3113, a different lamp will project the words "Light Load" on the screen at the operator control panel or console. One logic status of each line to this panel douses all lamps (clears the screen) and the other logic status lights that line's lamp.

(5) *Do "Light Load as Found" test.*—This step is similar to that of step 3. However, the computer will direct the equipment (the motor driven variable autotransformer 126 and relay tree 127) to make the changes to load the current coils of the meters at a lower "light load" current value during this comparison run. Also, it will divide its count by 10 because the standard meter produces its pulses at the same rate at light load as at full load and hence ten times as many during the one-tenth speed revolution of a test meter disk. At the end of this run the computer will store for each meter a deviation-number showing its accuracy at light load, as well as that previously stored by full load.

(6) *Flag any out of range meter.*—The computer will compare the deviation-numbers stored for each meter with tolerable standards stored in its program; and for any meter outside of the tolerable range will record this fact for later use in rejecting the meter. It may also be programmed to light the reject light of such a meter at this time.

(7) *Calculate calibration corrections for each meter.*—From the deviation number recorded for each meter being calibrated (except any just flagged as out of range), the computer will compute for that meter the amount and direction that each of its calibrating screws must be correctively adjusted. In the course of its calculation, the computer will use a formula which allows for the interaction between the two adjustments, or the effect of one adjustment on the need for the other. Steps 6 and 7 are both a matter of computer programming, and take place entirely within the computer 111.

(8) *Display METER ADJUST status.*—Again the computer will tell the exchange to connect its output with address number 3113 and when this has been done will send signals on the proper bit to first clear all projection lamps and then cause illumination of the lamp which projects "Meter Adjust" on the screen.

(9) *Calibrate Full Load and Light Load screws of each meter.*—Under direction of the computer through the exchange, the calibration motors for each meter (except any previously flagged as out of range) will be turned to effect the proper corrective calibration as determined by the calculations in step 7.

Using addresses 3100, 3101, 3102, 3103, 3104 and 3105, the computer causes the exchange to make three bit connections for controlling the corrective adjustment of each meter being calibrated. One of the three will control the direction of movement of the adjustment motors. Another will turn the full load adjustment motor 17F (FIG. 1) on and off and the third will turn the light load adjustment's motor 17L on and off. Both of these on and off controls will be exerted by means of electronic "gates." The adjustment motors are stepped by alternating current derived from the same source of power as that by which the computer is powered. Beginning when it starts an adjustment motor, the computer can merely count the number of pulses of this alternating current to know when the amount of movement has taken place which its prior calculation has determined to be needed, whereupon it actuates the gate to stop the motor.

For maximum accuracy, the computer is programmed to first "back out" the adjustment screws enough to need forward adjustment, and then move them all forwardly to their proper position. By uniformly ending with drive in one direction, any effect of backlash will be substantially eliminated. The screws should always have been last turned in the forward direction during preliminary assembly or other handling.

Although the wiring permits adjusting one meter at a time, this has not been found to be necessary. Present programming backs them all out at once, starts them all forward at once and terminates each forward drive when the screw being adjusted reaches the point corresponding to the calculated correction for it.

(10) *Display FULL LOAD status.*

(11) *Do "Full Load as Left" test.*

(12) *Display Light Load status.*

(13) *Do "Light Load as Left" test.*—It is at present desired that in the ordinary testing procedure there will at this stage be a second pair of comparison runs, one at full load test and one at light load. It permits the computer to prepare a report on each meter stating its accuracy after calibration, or "as left." It also permits the practice which is actually followed of holding for a second calibration operation meters which did not come up to a satisfactory standard of accuracy on the first calibration, and rejecting meters which go through a second calibration operation without coming up to standard. Steps 10–13 are essentially the same as steps 2–5, and therefore are not described further at this time. It should be noted, however that their deviation numbers showing their "as left" accuracy will be separately stored for each meter by the computer, which will also retain "as found" deviation numbers so that both can be reported in the individual meter's report prepared by control of the computer.

(14) *Display POWER FACTOR status.*—This merely projects the words "Power Factor" on the screen of the operator's control panel, by means of selecting another projection lamp at address 3113. It is the name of another comparison test about to be run.

(15) *Do "Power Factor as Left" test.*—This is a test which has heretofore been conventional in calibrating watt-hour meters, and consists of a comparison run with a .5 power factor, which means that there is a 60 degree phase displacement between the alternating voltage which energizes the potential coils of all of the meters, and the alternating current which represents the load on the current coils of all of the meters.

The computer directs the change in the manner of energizing the meters by changing the logical status between one and zero on the bit line connected through address 3112 and indicated in FIG. 2 as "1 OR .5 PF." Again the computer makes for each meter a separate count of the standard pulses received during exactly one revolution of the disk of the meter being calibrated, and records for each meter its .5 power factor accuracy thus indicated.

(16) *Display CREEP TEST status.*

(17) *Record Creep Data (from manual button actuation).*—For this one test there is human intervention, but the computer records the results. The creep test consists of maintaining the potential coil of each meter energized while the current coil has no current through it, and observing the meter disks.

To make meters accurate at light load, they are built with a "light load plate" which exerts a slight driving tendency on the disk. To be sure the disk is not rotated by this force alone, a small anticreep hole is provided in the disk. During this test, the operator, by hand, turns the disk to a position at which the anticreep hole should make it creep backwards. If he observes a suitable backwards movement within one minute, he presses adjacent each meter, thus found to be satisfactory, a "Creep O.K." button. The computer through a separate bit line for each meter, connected at addresses 3102 and 3103, receives an input signal for each meter in which the "Creep O.K." button is pressed, and records this result. When the operator then presses the "Manual Step" button or (when the "Creep O.K." button has been pressed for all meters) the computer proceeds with its program, and will reject the meters not recorded as "Creep O.K."

(18) *For each acceptable meter light a green light beside it, and light a red light beside each "Reject" meter.*— The computer is programmed to evaluate a meter as acceptable if the deviation numbers recorded for it at Steps 11, 13 and 15 are within standards determined by the manufacturer to be acceptable for each such test, and if its creep O.K. button was pressed. For each such meter, a signal is transmitted over the bit line of that meter when connected at address 3106 or 3107, thereby lighting a green "Meter O.K." light.

The computer is also programmed to cause a red or "reject" light by each meter to be lit if that meter was flagged at Step 6, or did not receive a "Creep O.K." indication, or if, having been held over from a prior run because of not meeting the manufacturer's standards on Tests 11, 13, or 15, it still fails to meet that standard on any of those tests.

In the case of any meter which on Tests 11, 13, and 15 failed to meet the manufacturer's standards, but had not failed on these tests previously, neither its red light nor its green light will be lit. It will be left on the rack for another run.

(19) *Display TEST COMPLETE status.*—This tells the operator to remove the meters with lights lit adjacent them.

(20) *Prepare individual meter reports.*—In the presently existing system, the computer is programmed to cause its associated typewriter to type a report on each meter not accepted, beginning with its position-number for identification. If the meter is not accepted, the out-of-tolerance data of the report is typed in red. The program can cause production of reports for the accepted meters, including their type designation, their "As Found" accuracy figures, and their "As Left" accuracy figures. Also, the program provides for production of punched tape record, which can be used as input to a properly programmed computer for satistical analysis.

In the case of meters which failed to meet acceptable standards on Step 15, and .5 power factor test, the typed report will show in red the amount of the meter's inaccuracy on this test. The present practice is for the operator to make a phasing correction in the meter while the meter remains on the rack, and leave the meter in place for another calibrating operation. The meters which are finally rejected, as indicated by the red light being lit adjacent them, will have attached to them a report stating the reason for their rejection, and will be taken elsewhere for special attention to see if they can be made acceptable.

If an IBM type of punch card report is desired for each meter, the computer can provide this by connection made at address 3116. Inasmuch as conventional card punches for such purposes are controlled by six bits on a coded basis, only six bit lines need be used for this purpose.

NUMEROUS VARIATIONS POSSIBLE

The equipment of this invention lends itself to numerous variations in programming. In fact, the presently used program only proceeds automatically from one major step to another if a "stop-manual-automatic mode" knob on the console is at "automatic mode" (which the computer can determine by testing the suitable bit connected at address 3114). When this knob is at "manual," the computer won't direct the beginning of the next step until the "manual step" button is pressed. While it waits, it will not only light the "step complete" light, but will keep flashing the "manual step" light, both through address 3114. When the manual step button is pressed, the computer will turn off the "step complete" light and light the "manual step" light continuously.

At several points during the operation, the computer, through address 3114, checks to see if the "test reset" button has been pressed. If it has been, the computer returns to its starting condition, or (later in the series) to a position to restart the current test. This is useful anytime the operator recognizes that something has gone wrong. For example, if he realizes in the middle of the test that he failed to connect the correction screwdrivers or has set the meter type switch wrong, he can set it right and press the reset button.

Under certain conditions, particularly if desired by a purchaser, the manufacturer may decide to subject meters to additional tests. Thus, as indicated in FIG. 2 at address 3113 (input), keys can close switches for an overload power factor test, an overload test, a light load test at half voltage, and a full load test at half voltage. The program causes the computer to check at the proper time as to whether these switches at address 3113 (input) are closed, and if so to perform the indicated test. The present program provides for all of these tests, following the power factor test, in the following order: full load half voltage test, light load half voltage test, overload test, and overload power factor test, but, of course, each is omitted unless its key is operated. Thus, in the relatively standard calibrating operation described above, the computer will, at the completion of the power factor test, first test to see if the reset button has been set; if not, it will check in succession to see if the full load half voltage switch is on, to see if the light load half voltage switch is on, to see if the overload switch is on, to see if the overload power factor switch is on. In each instance, if it finds that this switch for this test is closed, it will project the name of this test on the screen (address 3113) and then make the test. Because the creep test is also optional, the computer now checks for it and if it finds the creep switch closed, it will display the CREEP TEST status. Of course, with electronic computers, the time required for checking as to all of these switches is only a very small part of a second.

There may also be special conditions under which some of the tests indicated would be omitted. The creep test, and the light load as left test and the full load as left test can each be omitted by turning its key to the off or not desired position. In FIG. 2 at address 3113 (input) the last two switches, marked "light load" and "full load" are for the "as left" tests. The present program has no provision for omitting the initial full load and light load tests or for omitting the automatic calibration adjustments resulting from them.

One of the addresses to which the exchange can, on orders from the computer, connect computer output, is shown in FIG. 2 as "potential reverse" (address 3115). This can be used to turn the various disks of the meters under test a partial turn to the rear when this will save time. It should be remembered that the comparison run for each meter terminates when an anticreep hole passes through the beam of light. The next comparison run cannot begin until the disk rotates far enough for such a hole to again permit passage of the beam of light. It may sometimes save time, especially if there is only one creep hole in a disk, to stop the disk automatically at the end of its run (relays 160, FIG. 1) and then rotate the disks in the reverse direction far enough so that the creep holes will pass rearwardly through the beam of light, so that when again rotated forwardly they will pass the beam of light almost as soon as they reach full speed. The rearward movement of the meter disk can be achieved by reversing the connections to the meters' potential coils, by relay 157, FIG. 1, releasing relays 156 (both via address 3115) and supplying load current, via address 3112. The rearward movement of all can be stopped at once by releasing relay 165 (via address 3112) which will later be used to start them for the next comparison run.

TEMPORARY STORAGE OF PULSES

As seen in FIG. 2, the pulse input to the computer, when its input is connected to addresses 3100 and 3101, is not directly from the meters but is from a temporary storage center. There is a temporary storage unit for each of the meter positions, and for the standard meter. Each storage is in reality a pair of storage units, so that there is a receiving bank, and a secondary bank. Each time the computer is connected to this storage center for "reading" what is stored in it, everything stored in the receiving bank is instantaneously advanced to the secondary bank, thus clearing the receiving bank. The computer reads as much of the advanced or secondary bank as is located at one address at once, with one bit of reach meter, this part of secondary bank then being automatically cleared. The next time that the computer is connected for reading this part of the secondary bank, it will find in it only such impulses as are newly advanced to it from the receiving bank, and these will, of course, be only such impulses as have been received since the last advancement.

The computer makes these readings at great frequency. The frequency is so great, in fact, that there is no danger that two standard meter pulses will be received for storing between successive readings. The indication in FIG. 2 that the standard pulses are "2,000/rev." reflects that if the standard meter were a rotary disk type, using peripherally arranged demarkations which would be read by a photocell, the spacing of the demarkations would be such as to provide, either directly or after electronic doubling, 2,000 pulses per revolution. It is now preferred, however, to use an equivalent but more accurate standard meter which has no rotating disk. It is the equivalent, however, in producing pulses at a frequency which (with some simplification) is proportional to the watts (the current in the current coil circuit times the voltage across the voltage coil circuit). Because the available instrument of this type provides impulses at a much higher frequency than that of 2,000 per revolution, in fact, 18 times as high, the temporary storage center includes a device which counts these impulses and only delivers one impulse to the standard pulse receiving unit for each 18 received.

"EQUIPMENT MALFUNCTION" SIGNAL

In FIG. 2, at address 3114, the first of the indicator lights is for equipment malfunction. This lamp is not lit by a signal from the computer, however, but is lit automatically if clearing signals cease to be received from the computer. Thus, as long as the computer is operating, and can follow its program, signals will be received at the exchange which will almost constantly reset the timing circuit. If the timing circuit fails to receive the resetting signal during the short interval for which it is designed, it lights the "equipment malfunction" light. The computer is programmed for various conditions (besides its own failure) under which it will cease to send these reset signals.

DESCRIPTION OF TEST RACK AND CIRCUITRY

FIG. 1 represents a two-meter position in one of the meter test racks. For convenience, two-position units are in fact used and there are eight of these per rack. This apparatus has already been described to a large extent in Serial Number 505,072, above mentioned, and that disclosure is incorporated herein by reference. For the most part, the following description is devoted to circuitry and other features found helpful or necessary in connection with automatic calibration of meters by computer control.

Starting at the upper right-hand corner of FIG. 1, the control of calibration adjusting motors 17F and 17L has been shown. A pair of wires leading to each of these motors is used for reversing control. The direction of the two motors is controlled jointly, and hence a pair of wires 131 for this purpose from each of the motors can be joined. As the legend indicates, these wires are controlled by the reversing contacts of a relay which in turn is controlled by an electronic gate through circuitry controlled by the computer by using address 3100. Reversing relays, electronic gates and other suitable circuitry are all well known and for simplification, have not been illustrated. It may be mentioned, however, that in virtually all cases here shown of control by the computer there is a bistable gate, to remain in either condition until the computer tells it to change, and usually a power gate controlled by it for supplying enough power to operate a light or relay.

The "on" and "off" condition of motors 17F and 17L must be controllable separately. Each is shown with a separate wire 132 or 133 for this purpose, and each is controlled separately; at address 3102 for the full load adjustment motors 17F and 3104 for light load adjustment motors 17L. For each, electronic gating controls a mercury wetted reed relay which supplies alternating current to its motor. The computer is programmed to send its gate signals in this instance at a time which will open and close these relays while the controlled alternating current passes through zero so that there will be no split pulses.

The same style of designation of the manner of control and address of control of various other aspects of the circuitry is shown by legends in FIG. 1. It may be noted, however, that there should be no assumption that every element of the control preferably used is mentioned, since (except as mentioned) experts in teh art would know what to use. Dependability is extremely important. Hence, all relays are, generally speaking, of the mercury-wetted type.

Proceeding downwardly in FIG. 1, micro-switch 136 has been illustrated as being controlled jointly with jaws 22. There is one such micro-switch for each meter position and all of them are connected in series so that unless they are all closed by closing of the jaws (except such as may be bypassed because no meter is present) this circuit will not be closed and when the computer reads "Address 3111" it will not receive the "Jaws Closed" signal.

It may be explained that preferably the jaws are closed automatically when a meter to be tested is thrust home. The meter then closes diagonally located micro-switches (42 in FIG. 3) jointly required to close a circuit which operates a valve to remove air pressure from jaw-opening cylinders, so that these jaws close by stiff spring action.

The rejection light for each meter is separately controlled by the cable bit for that meter connected at address 3110, operating through successive gates.

Each meter O.K. light 139 is similarly controlled, except through address 3106. In this instance, a branch of the same circuit operates jaw release apparatus 141 which, by connecting the jaw-opening cylinders to air pressure, releases the jaws. This is shown in detail and explained in connection with FIG. 3, below. These cylinders are very reliable, the pistons being somewhat flared and needing slight compression of the flare to fit the cylinders, being Neoprene rubber, sealed and lubricated by a grease fill in the cylinder. The operator is now free to swing upwardly the rack carrying the adjustment motors, and remove the meter. He can also remove the meter by pressing its individual manual release button 142, which may separately close a circuit to jaw release apparatus 141.

As indicated diagrammatically for the left-hand photocell 29 in FIG. 1, this photocell preferably controls a gate 146 which in turn controls a relay 147, so that the circuit extending to the exchange is a low impedance circuit. In this instance, gate 146 is not bi-stable, and so the relay 147 releases its contact as soon as the light beam through the creep hole is cut off. Photocell 29, at the right, is similarly controlled, and the output of its relay 147 extends to the exchange through a separate wire. Thus, each of these wires goes to its own temporary storage unit at address 3100 from which it is read by a cable bit assigned to the particular meter position.

Each meter has a "Creep O.K." button 148 used as explained in connection with the creep test, step 17 above. The circuitry is shown more completely at the left. When the upper half of button 148 is pressed it actuates relay 149 which closes "Creep O.K." contacts 149A, and closes another contact to light lamp 149B to show that the "Creep O.K." button has been pressed. Contacts 149C holds relay 149 energized when button 148 springs back. The "Creep O.K." signal can be cancelled by pressing button 148 downwardly, closing a shunt 149D across relay 149. Relay 149 is also automatically deenergized by grounding its holding circuit (through a relay contact in unit 141, see FIG. 3) when the computer sends the "Meter O.K." signal.

ENERGIZING CIRCUITRY FOR METER POTENTIAL COILS

The lower half of FIG. 1 is connected with the circuitry as controlled by the computer for energizing the test meters. Two meter positions are shown corresponding to the two meter positions shown physically at the top of this FIG. 1. A meter 12 is diagrammatically represented in each. Correlation may be seen by reference to the meter connecting jaws 22 in the upper portion of the figure and also near the bottom of the figure. These are the same jaws, respectively for the same meter positions. Also, special potential test contact 151 is shown in both parts of the figure.

The meter potential coils 152 all derive their regulated potential from potential bus lines 153 and 154. These in turn derive their power from a delta source of three-phase alternating current 156. Reversing relay 157 need not be provided unless the potential reverse features described near the end of the section "Numerous Variations Possible" is desired. If provided it is controlled through address 3115, of course, with a succession of gates.

The automatic voltage regulation 158 is preferably that described in the application being filed nearly concurrently herewith, above mentioned.

Relay 159 is used to shift to .5 power factor. This is controlled by electronic gating at address 3112.

It should be observed that the same potential bus lines 153 and 154 run throughout the meter rack.

At each meter position is a potential-off relay 160. These relays are individually controlled with gating for each relay. Both addresses 3106 and 3110 are used in this instance, a relay tree being provided so that when both addresses are "called" the signals go to these "potential off" relays instead.

At each meter position there is a set of potential selecting relays 158. These may be controlled for each meter by a knob 159, seen only in the upper portion of FIG. 1. However, if these knobs are set at "M" then the circuitry illustrated in the lower part of FIG. 1 is established, for joint control. When a master knob is turned to "120 V," neither of the switches 161 is closed, and the relays in relay set 158 are all de-energized. Then the four secondary coils 163 are connected in parallel with one another so that the voltage impressed on meter potential coil 152 is that of just one of the coils 163, namely 120 volts. If switch 161 is closed by the master manual selecting knob, then relays are actuated in each set 158 to connect secondary coils of that set in two parallel pairs, the coils of each pair being in series so as to provide 240 volts. When both switches 161 and 162 are closed, additional relay actuation connects all four coils 163 in series so that the meter potential coil 152 will be energized with 480 volts. Relay 164 is controlled by the computer, via gating at address 3112, to be energized when there is to be a test at one-half normal voltage. As illustrated, this opens both of the control lines leading to potential selecting relay sets 158. This reduces the voltage on meter potential coils 152 to 120 volts, no matter what may be the setting of the master selector. This is because the one-half voltage test is only used for 240 volt meters. If need should arise for it to be used for 480 volt meters, an upper contact could be provided for the lower armature shown for relay 164, thereby providing 240 volt potential coil energization.

Each meter position is also provided with a "two-wire" relay 166, these all being jointly controlled by a switch on the operator's panel when he selects "2 Wire." In one position of relay 166, one side of test voltage is connected to the potential coil 152 only through special potential test contact 151. However, meters for two-wire circuits can use their normal potential coil connection to the upper right terminal blades which fit in the corresponding jaws 22. When meters of this type are being calibrated, the type switch set by the operator will control relays 166 to their alternate state, and is contacts 167 will connect that side of potential to the upper right jaws 22. Special contact 151 remains energized, but there is nothing on the meter for it to engage.

It may be mentioned that there are some meters which require a potential connection through one of the special contacts 163 shown in the upper part of FIG. 1. However, these may be permanently connected to the upper jaws 22, and therefore present no special problem here.

CURRENT COIL CIRCUITRY

Meters 12 are provided with current coils such as coils 171 and 171A. In fact, it is the interaction between the fields of these coils and coils 152 that rotates the meter disks 172. The current coils for all of the meters on a test rack, except the standard meter, are connected in one series circuit. With three-wire meters shown, this circuit uses conductors 173 connected as shown. Thus, air switch 174 is left open. Other air switches 175 are operated closed at each meter position, or by-pass switches in case no meter is located at that position. These switches are described in Serial Number 505,072 previously mentioned.

If meters for two wire circuits are being calibrated, the operator's "2 wire" switch will energize solenoid valves (not shown) to change the positions of air switches 174, 174A and 175 to convert the loading circuit to one suitable for such meters.

Current coil test circuits of this type are called phantom load circuits, because the current passing through the coils is not performing the work which would normally be performed by the current being measured in actual service. Hence it is not necessary to connect one of the main power lines through such a current coil during calibration, but instead the proper amount of current is put through them at very low voltage. The loading of the phantom load circuits is accomplished by a loading transformer 176. With a particular energization of primary coil 177, the amount of current flowing through tandem load circuits will depend upon which one of sixteen switches in ratio selecting switch box 180 is closed. This choice of switches also chooses, correspondingly, a ratio to be effective in current transformer 178, the secondary 179 of which supplies current to the standard meter, not shown. This, of course, is a precision current transformer, so that the chosen current level (5 amperes) in the standard meter will be accurately maintained if the chosen test current level is maintained in the phantom load circuit.

The correct air switch in switch box 180 is closed by supplying air to its air line, one of the 16 air lines leading from sixteen solenoid valves in valve box 181. This solenoid valve is chosen by relay tree 127 which energizes the correct one of sixteen lines leading to the respective solenoid valves. The proper relays of the relay tree 127 are energized by the choice of energization of four lines through gating at address 3112, under control of the computer. Thus, the computer is programmed, having read the type of meter being tested, and having come to the part of its program for a certain test, to choose the right one or more of the four lines controlling relay tree 127 to cause the right air switch in switch box 180 to be actuated so that the standard meter will receive 5 amperes and the phantom load circuit will receive the correct amount for the meter present and the test being made. In other words, this air switch simultaneously chooses the right tap connection of loading transformer 176, and the correct ratio tap from current transformer 178.

The correct energization of primary coil 177 is controlled by the joint influence of coarse adjustment motor 182, and fine adjustment motor 126, each adjusting an auto transformer. The use of both coarse and fine adjustments by autotransformers is highly desirable. The coarse adjustment permtis achieving approximately the right adjustment quickly, and the fine adjustment facilitates accuracy of final adjustment. The speed is especially important because it is desirable to adjust the coarse adjustment transformer 183 to "0" when switches of air switch box 180 are about to be switched so that there will be no arcing at the switches. The computer is, therefore, programmed to turn coarse adjustment motor 182 to provide "0" current prior to any time when the computer is about to cause a switching in air switch box 180. Then, once the proper switch in box 180 is closed, motor 182 will be driven in the advancing direction to set the coarse adjustment auto transformer 183 at the proper level for the test being made so as to be within range for fine adjustment by a motor 126. As previously explained, in connection with Step 3, the computer observes the standard meter impulses being received, calculates the error and the adjustment needed, and turns fine adjustment motor 126 the proper amount to make this adjustment. It can be programmed to recheck this adjustment at this time, or to recheck it frequently, and to make corrections as needed.

The auto transformer 183 is connected to a phasing auto transformer 184 which in turn is connected across a different side of the delta source 156 from that across which the voltage supply is connected. The tap of the phasing transformer 184 is automatically adjusted by phasing apparatus 186, which is preferably another form of the apparatus disclosed in the previously mentioned application being filed approximately concurrently.

This phasing adjustment maintains the current through current coils 171 accurately in phase with the potential applied across coils 152, except that when a 50 percent power factor run is desired, relay 188 will change this to a 60 degree phase displacement which, however, is automatically maintained by the phasing apparatus 186.

It may have been noticed that in nearly all of the addresses mentioned in this section were 3112. It should be understood, of course, that each of the functions indicated would be controlled by a different bit connected to that address, or a group of bits in certain instances.

TYPICAL EXCHANGE FACILITIES

The functioning of the exchange may be made more clear by reference to FIG. 3. The left side of this figure represents a highly simplified version of the exchange facilities relating to "Meter O.K." and "Creep O.K." Only three bit lines have been shown, instead of twelve, for each of the cables 113 and 114. Three is enough to illustrate the scheme, however. To avoid confusion, the three bits are designated "A," "B" and "C" instead of by their more usual designations of "0," "1" and "2." Each is provided with an input amplifier M113.

When the computer "wishes" to be connected to an address, it applies the "Enable" signal to line "M" and the appropriate address word to the bit lines. A selector 190 is connected to all of the bit lines and has the ability to react to the different bits constituting an address so as to select from the various control or enabling lines it controls the one having the "called" address. It may not need to use the entire word for selection, using the first part of the word to tell whether the call is addressed to it or to some other selector.

If it selects one of its controlled enabling lines the line thus signalled will extend to its own group of "and" junctions 191, thus enabling them to respond to a signal found on one of the bit lines to which each is connected.

By way of example, assume selector 190 has recognized the computer word 1–1–0. This happens to correspond to the octal numeral "6," which is the last digit of the meter O.K. address in FIG. 2. Accordingly, if lines B and C have the "1" status and line A has the "0" status, recognition unit 190 will select the "110 enable" line. Prior to this, the "and" junctions 191 were not able to pass along or respond to the address signals.

When "enabled" each of the "110 and" junctions 191 reacts to a meter O.K. status on the bit line to which it has just been connected, if there is such a status, to actuate its associated bi-stable gate or storage unit, F110A, F110B or F110C. The "F" denotes "flip-flop" the type of unit used. By "bi-stable" is meant that these gates, if thus "Turned On," remain "On" until something positively changes them. Thus, the computer is free to go about other functions.

Let us assume that bit line "B" is given a "Meter O.K." status. This will actuate bi-stable gate F110B to the "On" condition. It in turn will actuate power gate P110B to connect a suitable relay voltage through the coil of relay R110B. A mercury-wetted reed relay is here diagrammatically illustrated. In this instance a good quality signal relay will do.

Mercury relay R110B connects one side of an alternating current source (side A is indicated) to light "Meter O.K." lamp 139. All of the description now will be at the position of meter 2, since this is the one connected to bit line "B" for which the "Meter O.K." signal has been given.

In connection with FIG. 1, mention was made that the O.K. signal actuates a jaw release mechanism. This will now be explained.

Meter O.K. lamp is lit by current received from relay R110B over wire 76, 76', and wire 77 connected to the B side of the A.C. source. A rectifier 78 passes a rectified form of the same current to relay 79. An intervening resistor and condenser in parallel limit to a few seconds the time during which relay 79 will remain energized. When top contact of relay 79 breaks a circuit through two micro-switches "MS" and the coil of solenoid valve 80, whereupon the valve springs to a position at which it connects air pressure to the internal space of four cylinders 24 (only one shown) described in application, Serial Number 505,072. This spreads apart the jaws 26 which in the meantime have been firmly clamping terminal blades 21 of a meter. The meter 12, represented by a backplate, is now pushed out by the spring action of test connectors such as 151. The test connectors are only diagrammatically represented as a pusher, not attempting to show electrical conduction. The meter is suspended at its top on a pin which permits it to swing out far enough so that the micro-switches 42 open and prevent reclosing of the valve opening circuit until the next time that a meter is pressed home.

The second contact of relay 79 turns off the "Creep O.K." light in a manner described below.

The bottom contact relay 79 opens to prevent the closing of the "Creep O.K." circuit by the manual button 148 while the "Meter O.K." relay 79 is energized.

Signal lines in cable 113 are available for clearing the exchange of all prior actuation when the computer applies the proper signal to it, or for clearing certain signals.

If it is desired at any time to remove a meter separately, the clamp 26 holding it can be released by pressing a manual release button 81. This releases the jaws by breaking, at this point, the circuit through the coil of solenoid valve 80. To guard against the possibility that a mere quick touch of button 81 might not hold the circuit open long enough to fully effectuate release, button 81 also connects side "A" of the alternating power to wire 83 to actuate relay 79.

"CREEP O.K." SIGNAL

FIG. 3 also shows the means by which the "Creep O.K." signal is actuated. When the upper end of rocker button 148 is pressed, it closes contacts 84, connecting the "B" side of alternating current to the bottom contact of relay 79 to "Creep O.K." relay 149. The circuitry for this has already been explained in connection with FIG. 1 and therefore will not be repeated here. One detail not specifically described there is the manner of grounding upon an "O.K." signal. It will be remembered that after initial actuation and release of button 148, relay 149 is held by a circuit through its top contact and a resistor 86. When relay 79 is actuated to release the jaws, its middle armature connects line "A" also to the holding circuit of the relay, resistance 86 enabling this connection to shunt the relay without causing a short circuit.

While "Creep O.K." relay 149 remains energized, its bottom armature 87 connects the "Signal Common" source to a line leading to inverter I010 in the exchange. The computer can now read this signal at will. When the computer is ready to read the "Creep O.K." signal, it sends an enabling or connect signal on line "M" and sends a computer address word over the bit group by applying to lines C, B and A respectively, the status 0–1–0. This corresponds to octal 2 and has been chosen as the illustrative identification address in this instance because it corresponds to octal "2" which is the last digit of the address 3102 for "Creep O.K." in FIG. 2.

The operation is much the same as described in connection with recognition address 110. When selector 190 recognizes this address, while being energized by the appropriate signal over signal line "M," it selects its controlled enabling line 010, and applies an enabling signal to it. This enables each of the "and" junctions of line 010 to respond to the "Creep O.K." signal. In this instance, however, the bit lines are A', B' and C' which are in the bit group leading to the computer input cable 114 and the bit lines to which these "and" junctions are connected. With respect to the illustrated meter position of FIG. 3, if the "Creep O.K." button has been actuated and relay 149 is energized, its contact 87 will connect signal common (ground) to its line 88 so that this status indication or signal will be available to bit line B' whenever the computer, following its program, sends the appropriate signals described for reading the various "Creep O.K." conditions. This test is made near the end of the usual calibration operation, and it is therefore convenient to terminate the availability of the "Creep O.K." signal by de-energizing relay 149 upon energization of the "Meter O.K." relay 79. That is accomplished as described by the middle contact of relay 79. In a case of an occasional meter which does not receive a "Meter O.K." signal, the operator can deactuate relay 149 by touching the lower end of button 148. This directly shunts relay 149.

The "Creep O.K." light 149B remains lit as long as relay 149 is energized, and so the operator can know the status. In the case of a meter left on the rack for a second calibration run, the operator may choose to leave the "Creep O.K." light on if he knows there is no need to check it again. If, for example, he merely needs to make a phasing adjustment and knows that there will be little or no recalibration of the meter, he can be sufficiently confident that the meter would pass the creep test again.

THE CHECK-STANDARD METER

It is preferred that one of the meter positions on each rack be occupied by a meter which may conveniently be designated as a "check-standard meter." This meter remains in place through many calibration operations. It could be located at one of the regular test positions (with minor changes there, and changes in the program). However, it may also with economy be in a position specially provided and omitting certain of the features at the test position. There is no need for the calibration motors or the racks which supports them. The automatic control of the clamping jaws might be omitted. In fact, other means could be provided for opening them instead of air cylinders. The meter reject and meter O.K. lights can be omitted and the creep test button. It may be desirable to modify the circuitry so that a given check-standard meter can remain in place regardless of what meters are being tested, the program being varied accordingly. The preferred location is in the standard meter part of the energizing circuitry.

The check-standard meter will be subjected to every comparison run to which the test meters are being subjected. The computer receives signals for this meter from its detector of disk rotations. Perhaps all of these detectors could be called disk-position detectors with more accuracy.

The computer is programmed to use the check-standard meter for determining after each comparison run whether there was proper operation. This it does by comparing the number of standard meter pulses counted for one exact revolution of the check-standard meter, or more than one if so programmed, with the number of impulses which should have been received. Only a very narrow latitude is allowed, and if this latitude is exceeded on any comparison run, the computer is programmed to stop the comparison run immediately and type out a notation that there is a check-standard discrepancy. The amount and direction thereof can be determined, using the computer's display output register. The operator can decide whether to push the reset button and try again, or to try immediately to locate a source of trouble. Of course, if "check-standard discrepancy" is noted unusually often, and especially if the discrepancy is consistently in one direction, a discrepancy between the standard meter and the check-standard meter is to be suspected. The computer can be programmed to make a special comparison run of longer duration to determine the exact discrepancy between these two. Of course, the check-standard meter should be easily removable for substitution and for return to the laboratory for servicing and recalibration.

DEPENDABILITY OF DIGITAL OPERATIONS

It will be observed that not only is this system designed to work with a digital computer, but all of the signals which comprise any part of the communication either way between the equipment and the computer are of a type which do not need to be evaluated by strength. Most of them are simply "On" or "Off" signals. Pulses are only a frequent repetition of "On" and "Off." Even the alternating current by which the movement of the calibration correcting motors is measured is only a succession of integer signals, one for each half wave, or one for each wave if the computer is programmed to count only one polarity.

This all-digital system is extremely dependable. Not only is it free from the inevitable evaluation errors, but the signals can be all strong enough to be readily distinguished from any possible electrical "noise" which might interfere with other types of evaluation.

Occasionally, a meter needs no correction. The all-digital system, together with backing out the adjustments and driving back to the same point, followed by a second comparison run, provides a check on the fidelity of the meter adjustment devices. If an error appears on the rerun, something needs attention.

Another feature of the invention, to which the digital system contributes, is that the system provides essentially constant energy for the comparison runs. This is because the phantom load current is adjusted as each comparison run is about to be made, and the computer's standard of adjustment is not merely a given current value, but the current value which will yield exactly the correct number of standard meter pulses. This is a reflection of energy or power, instead of just current. It is not *current* for which the meter accuracy is sought, but power or energy.

AVAILABILITY OF PROGRAM

The program which has actually been used for the equipment here disclosed, in conjunction with a "Control Data 160 Computer" made by Control Data Corporation, is being concurrenlty published (Duncan Singlephase Calibrater 3A4 Listings April 6, 1966) with copyright notice and is available, a copy being furnished to the Patent Office. In case it should be needed for any detail of disclosure, said program is hereby incorporated in this application by reference. Of course, other computers can be used. Some would need minor program modifications. Others would need conversion to their own different program language.

The term "design-set" is used to refer to built-in determinations, such as the particular bit terminal which is the only one to which a given adjunct of a given meter, through a given address, is connected.

The term "connected" is used loosely, in the sense of communication of a signal rather than being confined to direct electrical circuit connections.

We claim:

1. The method of calibrating meters which comprises automatically performing the following steps:
 energizing with accurately correlated energization a plurality of test meters to be calibrated and with each of which is associated disk-position detecting means and calibration adjustment motors for light and full load adjustment devices, and a standard meter with which is associated means for producing pulses in proportion to the energy consumption which its measurement represents and at a frequency to produce a multitude of impulses per revolution of the meters being calibrated,
 registering for each test meter a count of standard meter impulses occurring between two position-indications for its disk representing an exact revolution of its disk, turning each of said adjustment motors in the same direction as its counter-parts on other test meters to move each adjustment device in that direction beyond its position for accuracy while measuring the motor movement required for this, calculating for each meter the respective movements required for its associated motors to return the adjustment devices to their position of accuracy based on the respective meters' impulse counts, reversing said motors, measuring their return movement, and discontinuing each one separately when the measurement therefor indicates that its adjustment device has reached the position of accuracy; said measurements being made by digital counting of the impulses corresponding to motor driving impulses while the motors are turned an accurate increment for each impulse.

2. The method of calibrating meters which comprises automatically performing the following steps:
 energizing with accurately correlated energization a plurality of test meters to be calibrated and with each of which is associated disk-position detecting means and calibration adjustment motors for light and full load adjustment devices, and a standard meter with which is associated means for producing pulses in proportion to the energy consumption which its measurement represents and at a frequency to produce a multitude of impulses per revolution of the meters being calibrated,
 registering for each test meter a count of standard meter impulses occurring between two position-indications for its disk representing an exact revolution of its disk, turning each of said adjustment motors in the same direction as its counter-parts on other test meters to move each adjustment device in that direction beyond its position for accuracy while measuring the motor movement required for this, calculating for each meter the respective movements required for its associated motors to return the adjustment devices to their position of accuracy based on the respective meters' pulse counts, reversing said motors, measuring their return movement, and discontinuing each one separately when the measurement therefor indicates that its adjustment device has reached the position of accuracy.

3. The method of calibrating meters which comprises automatically performing the following steps:
 energizing with accurately correlated energization a plurality of test meters to be calibrated and with each of which is associated impulse transmitting disk-position detecting means, and calibration adjustment motors, characterized for moving accurate increments for each driving impulse, for light and full load adjustment devices, and a standard meter with which is associated means for producing pulses in proportion to the energy consumption which its measurement represents and at a frequency to produce a multitude of impulses per revolution of the meters being calibrated,
 registering for each test meter a digital count of standard meter impulses occurring between two position impulses for its disk representing an exact revolution of its disk, pulse-turning each of said adjustment motors in the same direction as its counterparts on other test meters to move each adjustment device in that direction beyond its position for accuracy while counting the pulses required for this, calculating for each meter the respective movements required for its associated motors to return the adjustment devices to their position of accuracy based on the respective meters' pulse counts, reversing said motors, pulse counting their return movement, and discontinuing each one separately when the count therefor indicates that its adjustment device has reached the calculated position of accuracy.

4. Apparatus for the automatic calibration of meters including a rack for a plurality of test meters to be calibrated, having, for each meter, jaws for connecting and holding the meter and having associated therewith a standard meter and means for deriving from the standard meter pulses representing the apparent energy measurement thereof, circuitry for energizing all of said meters with accurate correlation for comparison runs with different loadings, an exchange having a bank of computer-input terminals and a bank of computer-output terminals suitable for connection to a digital computer, each bank including a group of terminals each of which is design-set to correspond to a bit position of a computer word, and additional terminals, including instruction signal terminals;

selective recognition and connection means responsive to signals over one of said groups of terminals to identify selectively any one of a variety of addresses indicated by a computer word received through said group of terminals, and in response to instruction signals make connections from various of said terminals, each directly or indirectly to a specific element by design-set choice, for a specific function of control or signal nature with respect to said rack, said elements including some elements with which, upon direction by certain address words, are connected by said connection means to conductors of the bit word group of computer input terminals for enabling the computer to obtain a count of standard meter pulses, and to read various settings by an operator, and said elements also including some elements, individual to each meter position, for response to the position-detecting means for the disk of that meter, for a manually settable visual observation report, for gating on and off each of the calibration motors of said position, for providing a reject indication, and for providing a "Meter O.K." indication;

and said elements also including elements for controlling the direction of drive of calibration adjustment motors, for ratio control of the respective loadings on the test meters and the standard meter, for current load adjustment and for power factor choice, and means at each meter position responsive to the signal providing the "Meter O.K." indication for releasing the jaws for an automatically predetermined time, and for terminating the setting made concerning the visual observation.

5. Apparatus for the automatic calibration of meters including a rack for a plurality of test meters to be calibrated, having, for each meter, jaws for connecting and holding the meter and having associated therewith a standard meter and means for deriving from the standard meter pulses representing the apparent energy measurement thereof, circuitry for energizing all of said meters with accurate correlation for comparison runs with different loadings, an exchange having a bank of computer-input terminals and a bank of computer-output terminals suitable for connection to a digital computer, each bank including a group of terminals each of which is design-set to correspond to a bit position of a computer word, and additional terminals, including instruction signal terminals;

selective recognition and connection means responsive to signals over one of said groups of terminals to identify selectively any one of a variety of addresses indicated by a computer word received through said group of terminals, and in response to instruction signals make connections from various of said terminals, each directly or indirectly to a specific element by design-set choice, for a specific function of control or signal nature with respect to said rack, said elements including some elements with which, upon direction by certain address words, are connected by said connection means to conductors of the bit word group of computer input terminals for enabling the computer to obtain a count of standard meter pulses, and to read various settings by an operator, and said elements also including some elements, individual to each meter position, for response to the position-detecting means for the disk of that meter, for a manually settable visual observation report, for gating on and off each of the calibration motors of said position, for providing a reject indication, and for providing a "Meter O.K." indication;

and said elements also including elements for controlling the direction of drive of calibration adjustment motors, for ratio control of the respective loading on the test meters and the standard meter, for current load adjustment and for power factor choice.

6. Apparatus for the automatic calibration of meters including a rack for a plurality of test meters to be calibrated, having, for each meter, jaws for connecting and holding the meter and having associated therewith a standard meter and means for deriving from the standard meter pulses representing the apparent energy measurement thereof, circuitry for energizing all of said meters with accurate correlation for comparison runs with different loadings, an exchange having a bank of computer-input terminals and a bank of computer-output terminals suitable for connection to a digital computer, each bank including a group of terminals each of which is design-set to correspond to a bit position of a computer word, and additional terminals, including instruction signal terminals;

selective recognition and connection means responsive to signals over one of said groups of terminals to identify selecitvely any one of a variety of addresses indicated by a computer word received through said group of terminals, and in response to instruction signals make connections from various of said terminals, each directly or indirectly to a specific element by design-set choice, for a specific function of control or signal nature with respect to said rack, said elements including some elements with which, upon direction by certain address words, are connected by said connection means to conductors of the bit word group of computer input terminals for enabling the computer to obtain a count of standard meter pulses, and to read various settings by an operator, and said elements also including some elements, individual to each meter position, for response to the position-detecting means for the disk of that meter, for gating on and off each of the calibration motors of said position, for providing a reject indication, and for providing a "Meter O.K." indication;

and said elements also including elements for controlling the direction of drive of calibration adjustment motors.

7. Apparatus for the automatic calibration of meters according to claim 6 in which:

said elements include a manual switch which in conjunction with the computer comprises means for causing a series of major operational steps of calibration to be followed with automatic progression, and another manual switch, which, when the first named switch is not operated, comprises means for causing operation, successively with successive actuation, of individual major steps.

8. Apparatus for the automatic cailbration of meters according to claim 6 in which:
said circuitry for energizing the meters includes two motor-driven adjustable autotransformers connected in a circuit for controlling the current through the meter current coils, one connected for quick and coarse adjustment of said circuit and the other for fine adjustment of said circuit; and means for automatically controlling the adjustments of said autotransformers individually; said coarse adjustment transformer being adapted to cause reduction to substantially zero of the current through said coils to permit switching with respect to said current coils at no-load condition.

9. Apparatus for the automatic calibration of meters according to claim 6 including:
clamp connectors for gripping the terminal blades of the meters to connect them and hold the meters in place, a circuit controlling said clamp connectors, means for controlling said circuit to cause said clamp connectors to remain open except when a meter is pressed "home," automatic means for reversing said control when a test is complete to release the meters, said automatic means being effective for only a short interval, and means for biasing the meters to move them during said interval to a position at which the first named means for controlling said circuit is effective to maintain the connector clamps in open position.

10. Apparatus for the automatic calibration of meters according to claim 6, including temporary storage means associated with the exchange having a separate unit for each test meter, for storing and making available to the respective computer input terminals, on command, comparison run pulse information for the respective test meters.

11. Apparatus for the automatic calibration of meters according to claim 6 in which:
said circuitry for energizing the meters including two motor-driven adjustable autotransformers connected in a circuit for controlling the current through the meter current coils, one connected for quick and coarse adjustment of said circuit and the other for fine adjustment of said circuit; and means for automatically controlling the adjustments of said autotransformers individually.

12. Apparatus for the automatic calibration of meters according to claim 6 in which:
said circuitry for energizing the meters including two motor-driven adjustable autotransformers connected in a circuit for controlling the current though the meter current coils, one connected fo quick and coarse adjustment of said circuit and the other for fine adjustment of said circuit; and means for automatically controlling the adjustments of said autotransformers individually; said fine adjustment transformer being adapted for frequent adjustments to correct the current through the meter coils to maintain loading accurately at a desired level.

13. Apparatus for the automatic calibration of meters according to claim 6 including:
clamp connectors for gripping the terminal blades of the meters to connect them and hold the meters in place, a circuit controlling said clamp connectors, means for controlling said circuit to cause said clamp connectors to remain open except when a meter is pressed "home," and automatic means for reversing said control when a test is complete to release the meters.

14. Apparatus for the automatic calibration of meters according to claim 6, including means for securing each test meter in place during a test and releasing them at the end of a test, and report preparing means for indicating the test result as to each meter.

References Cited

UNITED STATES PATENTS 2,938,165  5/1960  Greig.
2,957,132  10/1960  Burkhart.

RUDOLPH V. ROLINEC, *Primary Examiner.*

E. L. STOLARUN, *Assistant Examiner.*